No. 720,434. PATENTED FEB. 10, 1903.
G. S. JEWETT.
SELF HEATING CAN FOR CANNED GOODS.
APPLICATION FILED JULY 28, 1902.
NO MODEL.
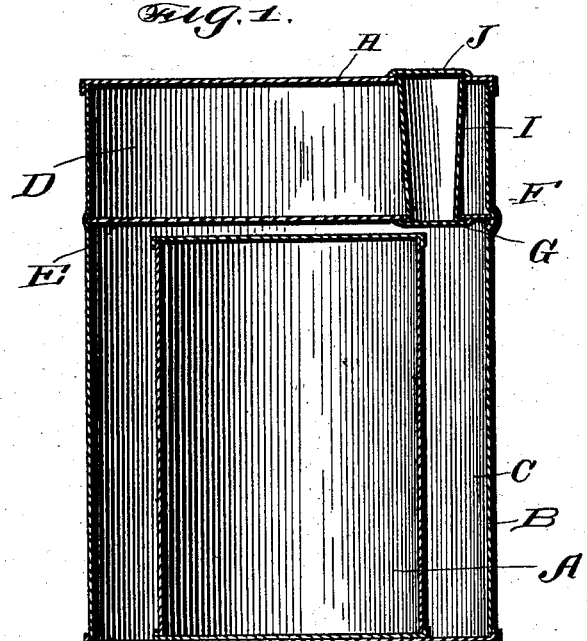
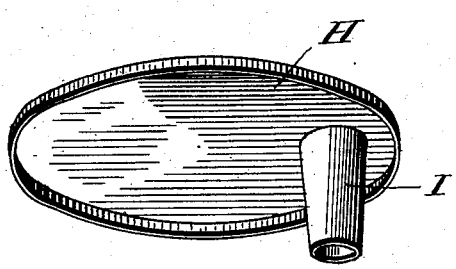
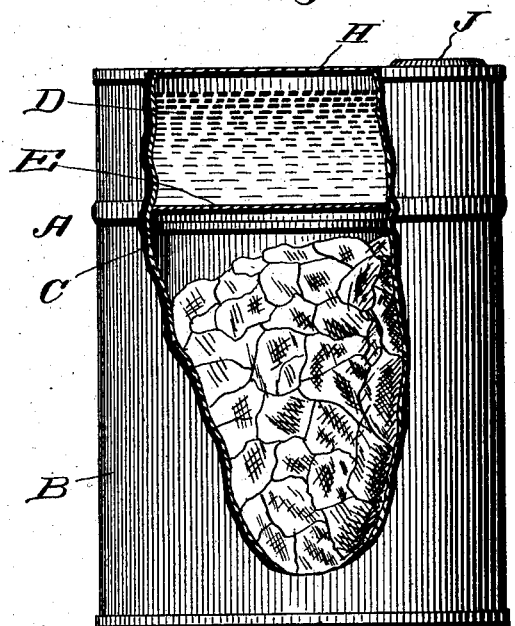
Witnesses
R. A. Boswell.
A. L. Hoyt.
Inventor
George S. Jewett,
By Franklin H. Hough
Attorney

United States Patent Office.

GEORGE SIDNEY JEWETT, OF NORRIDGEWOCK, MAINE.

SELF-HEATING CAN FOR CANNED GOODS.

SPECIFICATION forming part of Letters Patent No. 720,434, dated February 10, 1903.

Application filed July 28, 1902. Serial No. 117,385. (No model.)

*To all whom it may concern:*

Be it known that I, GEORGE SIDNEY JEWETT, a citizen of the United States, residing at Norridgewock, in the county of Somerset and State of Maine, have invented certain new and useful Improvements in Self-Heating Cans for Canned Goods; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in self-heating cans for canned goods; and it has for its object the provision of simple, inexpensive, and efficient means whereby canned vegetables, &c., may be heated or cooked while still retained in the can without necessitating the use of fire. Canned goods of various kinds—such, for instance, as beans, peas, tomatoes, &c.—are placed upon the market in tin cans, the goods being in condition for serving at once upon being heated or warmed. Other vegetables and fruits which are packed in cans require a slight degree of cooking only in order to render the same suitable for use; and the essential object of the present invention resides in the provision of means whereby canned goods of any description may be readily warmed or cooked by the application of heat resulting from the slaking of lime within the chamber surrounding the can.

To these ends and to such others as the invention may pertain the same consists in the peculiar construction of the can and in the provision in connection therewith of an outer chamber surrounding the can, said chamber being adapted to receive unslaked lime, and in connection therewith the provision of a chamber containing water and means whereby the water may be introduced into the chamber containing the lime, thereby imparting to the contents of the can a sufficient degree of heat to warm or cook the same, as may be desired.

To these ends and to such others as the invention may pertain the same consists in the novel construction of the can and in the combination, arrangement, and adaptation of parts, all as more fully hereinafter described, shown in the accompanying drawings, and then specifically defined in the appended claim.

The invention is clearly illustrated in the accompanying drawings, which, with the letters of reference marked thereon, form a part of this specification, like letters of reference indicating similar parts throughout the several views, in which—

Figure 1 is a central vertical sectional view through a fruit or vegetable can provided with my heating apparatus. Fig. 2 is a perspective view of the cap or top of the outer can, showing the punch carried thereby. Fig. 3 is a side elevation of the complete device with parts broken away.

Reference now being had to the details of the drawings by letter, A designates the inner can, which may be of any desired or suitable size or form of construction, but preferably of the standard size and form of the cans which are commonly used in packing vegetables, fruits, &c. Surrounding this can is an outer can B, of metal, the intervening space C between the inner and outer cans forming a chamber which it is proposed to fill with unslaked lime, which when brought into contact with water serves to generate heat. Immediately above the can A and its surrounding chamber I provide a chamber D, and the bottom E of said chamber is provided with an opening F, to the under side of which is soldered a cap or cover G.

H is the cover of the outer box or receptacle, which cover is securely soldered in place and is provided with a punch I, which is preferably cylindrical in form. This punch is soldered or otherwise secured at its upper end to the walls of an aperture in the cover H, as shown, with its lower or cutting edge bearing upon the upper surface of the cap G in the bottom of the water-chamber. Upon the upper face of the outer cap and immediately above the upper end of the punch I is provided a cap or projection J, which may be soldered or otherwise secured to the can.

From the foregoing description the use of the device will be readily understood. The inner can, containing the fruit or vegetables, is filled and sealed in the usual way. The space intervening between the inner and outer cans is then filled with unslaked lime or other substance which when brought into contact with water generates heat. The upper chamber or reservoir D is then filled with water, and the cover of the outer can is soldered or otherwise secured in place. The can is thus placed in condition for use. When it is designed to warm or cook the contents of the inner can, it is simply necessary to impart a blow to the cap J, which will serve to cause the punch to force the cap G from its seat and at the same time destroy the cap at the upper end of the punch, thus allowing the water contained in the water-chamber to enter the lime-filled space surrounding the inner can and furnishing an outlet or vent for the escaping steam at the upper end of the can. It has been found from practical experiments that the slaking of the lime in the space surrounding the can will serve to quickly heat or cook the contents of the can, thus rendering the contents of the can in condition to serve without the necessity of using fire.

Having thus fully described my invention, what I claim as new, and desire to secure by Letters Patent, is—

In combination with a can B, a sealed receptacle mounted therein, and having a space intermediate the surrounding walls thereof and the walls of the outer can, an apertured partition supported in an annular recess in the wall of the can, a disk sealing the aperture through said partition, a conical-shaped cutter I resting upon said disk, a flanged cover having an aperture, to walls of which said cutter is fastened, and a covering J fastened to the cover A and positioned over the conical cutter, substantially as shown and described.

In testimony whereof I hereunto affix my signature in presence of two witnesses.

GEORGE SIDNEY JEWETT.

Witnesses:
FORREST GOODWIN,
FRED. E. JEWETT.